(12) United States Patent
Dawkins et al.

(10) Patent No.: US 12,155,705 B2
(45) Date of Patent: Nov. 26, 2024

(54) TECHNIQUES FOR MONITORING ENCRYPTED STREAMING TRAFFIC USING UNDERLYING TRANSPORT METRICS

(71) Applicant: TENCENT AMERICA LLC, Palo Alto, CA (US)

(72) Inventors: Paul Spencer Dawkins, Palo Alto, CA (US); Stephan Wenger, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 56 days.

(21) Appl. No.: 17/703,314

(22) Filed: Mar. 24, 2022

(65) Prior Publication Data

US 2022/0417303 A1    Dec. 29, 2022

Related U.S. Application Data

(60) Provisional application No. 63/215,890, filed on Jun. 28, 2021.

(51) Int. Cl.
| | |
|---|---|
| *H04L 65/60* | (2022.01) |
| *H04L 9/40* | (2022.01) |
| *H04L 43/028* | (2022.01) |
| *H04L 43/04* | (2022.01) |
| *H04L 65/80* | (2022.01) |

(52) U.S. Cl.
CPC ............ *H04L 65/60* (2013.01); *H04L 43/028* (2013.01); *H04L 43/04* (2013.01); *H04L 63/0428* (2013.01); *H04L 65/80* (2013.01)

(58) Field of Classification Search
None
See application file for complete search history.

(56) References Cited

U.S. PATENT DOCUMENTS

| | | | |
|---|---|---|---|
| 2018/0191867 A1* | 7/2018 | Siebel | ............... H04L 67/61 |
| 2019/0044705 A1 | 2/2019 | Deval et al. | |
| 2019/0199835 A1 | 6/2019 | Deval et al. | |
| 2019/0230010 A1* | 7/2019 | Guo | ............... H04L 43/0894 |

(Continued)

OTHER PUBLICATIONS

Mazhar et al. "Real-time Video Quality of Experience Monitoring for HTTPS and QUIC", IEEE INFOCOM 2018, Apr. 16, 2018 [retrieved on Aug. 27, 2022]. DOI: 10.1109/INFOCOM.2018.8486321. (Year: 2018).*

(Continued)

*Primary Examiner* — Natisha D Cox
(74) *Attorney, Agent, or Firm* — Sughrue Mion, PLLC (57) ABSTRACT

A method and an apparatus for monitoring encrypted traffic, performed by at least one processor. The method includes generating a transport summary of a media stream at a streaming source or a streaming destination using a plurality of transport layer metrics, wherein the media stream is encrypted, and wherein the transport layer metrics comprise path characteristics derived from duplicated QUIC packets in the media stream at the streaming source or a streaming destination, transferring the transport summary to a network monitor function, analyzing the transport summary and correlating it with transport summaries collected from other sources and other destinations. The transport summary may include information on duplicate QUIC packets in the media stream.

20 Claims, 7 Drawing Sheets

(56) References Cited

U.S. PATENT DOCUMENTS

| | | |
|---|---|---|
| 2019/0319873 A1 | 10/2019 | Shelar et al. |
| 2020/0084663 A1* | 3/2020 | Park .................. H04W 8/08 |
| 2021/0006642 A1* | 1/2021 | He .................... H04L 43/16 |
| 2021/0099427 A1 | 4/2021 | Masputra et al. |
| 2021/0203578 A1* | 7/2021 | Li ..................... H04L 43/04 |
| 2021/0258817 A1* | 8/2021 | Kolding ............ H04L 45/24 |
| 2021/0336896 A1* | 10/2021 | Calmon ............ H04L 45/16 |
| 2023/0072769 A1* | 3/2023 | Yeh .................. H04W 28/02 |

OTHER PUBLICATIONS

Vu et al. "On the Latency of Multipath-QUIC in Real-time Applications", 2020 16th Int'l Confince on Wireless and Mobile Computing, Networking and Comm'ns, Oct. 12, 2020. DOI: 10.1109/WiMob50308.2020.9253402. (Year: 2020).*

Iyengar et al. "RFC 9000", datatracker.ietf.org, May 2021 [retrieved on Aug. 27, 2022]. Retrieved from the Internet: <URL: https://datatracker.ietf.org/doc/html/rfc9000#section-21.10>. (Year: 2021).*

Hasselquist et al. "QUIC Throughput and Fairness over Dual Connectivity", IEEE MASCOTS Workshop, Nov. 17, 2020 [retrieved on Dec. 15, 2022]. Retrieved from the Internet: <URL: https://www.ida.liu.se/~nikca89/papers/mascots20a.pdf>. (Year: 2020).*

De Connick et al. "Multipath QUIC: Design and Evaluation", CoNEXT 17, Dec. 12, 2017 [retrieved on Dec. 15, 2022]. Retrieved from the Internet: <URL: https://multipath-quic.org/conext17-deconinck.pdf>. (Year: 2017).*

International Search Report dated Aug. 2, 2022 from the International Searching Authority in International Application No. PCT/US2022/028669.

Written Opinion dated Aug. 2, 2022 from the International Searching Authority in International Application No. PCT/US2022/028669.

* cited by examiner

TECHNIQUES FOR MONITORING ENCRYPTED STREAMING TRAFFIC USING UNDERLYING TRANSPORT METRICS

CROSS-REFERENCE TO RELATED APPLICATION

This application is based on and claims priority to U.S. Provisional Patent Application No. 63/215,890, filed on Jun. 28, 2021, the disclosure of which is incorporated by reference herein in its entirety.

FIELD

Embodiments of the present disclosure may relate to the design and operation of networked computers used for streaming media between computers using encrypted transport protocols on the paths between them. Specifically, embodiments of the present disclosure relate to identifying the impact of transport path impediments within the network on the user experience when streaming media.

BACKGROUND

Figure 1:
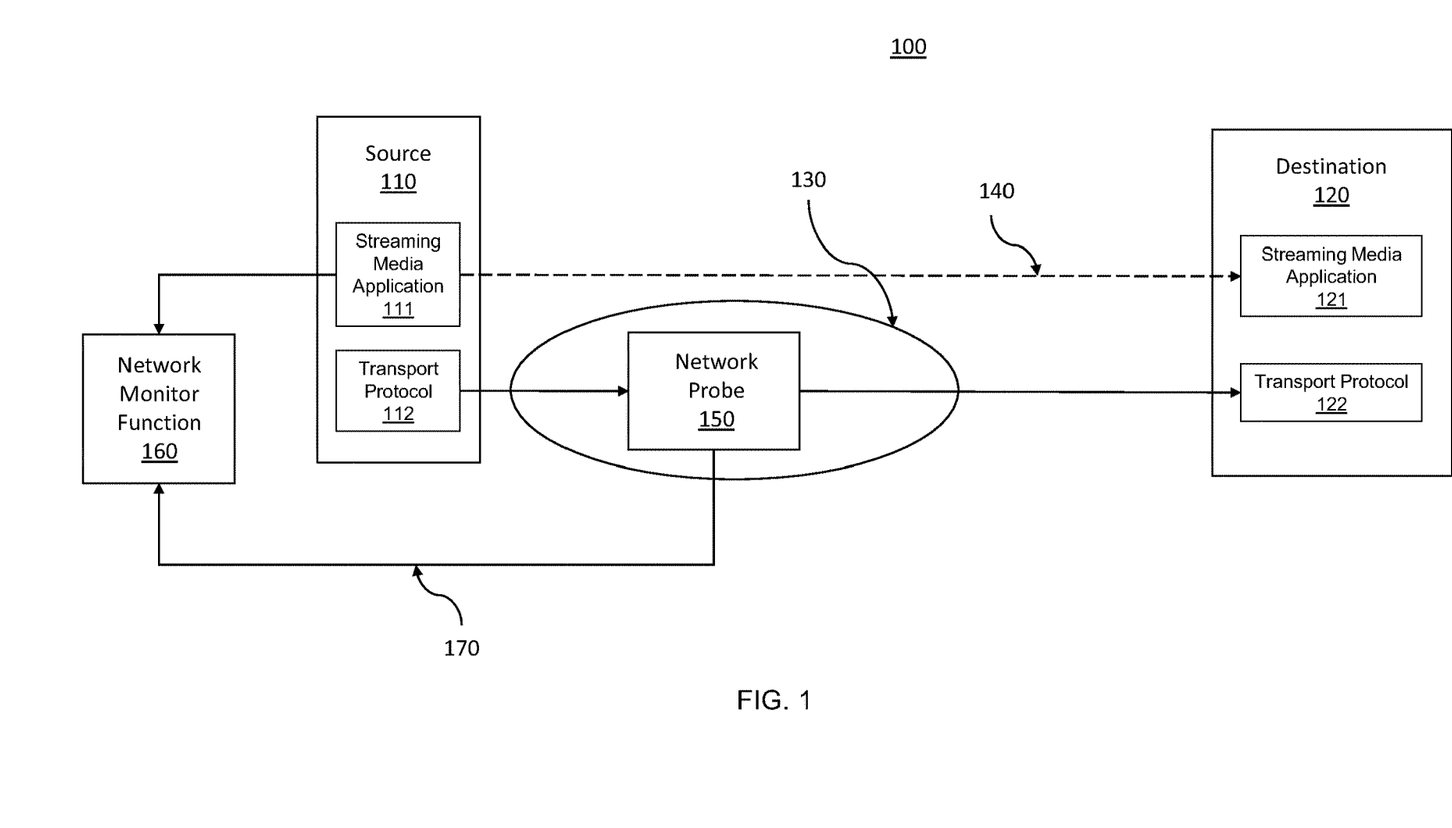
FIG. 1 is a schematic illustration of a computer network following a streaming protocol stack over an unencrypted transport protocol.

FIG. 1 illustrates a computer network 100 with multiple computers which may act as streaming media sources or streaming media destinations. Specifically, FIG. 1 illustrates a streaming protocol stack (e.g., DASH-IF or HLS) over an unencrypted transport protocol (e.g., TCP/IP) according to related art. The sources and the destinations are connected to each other by one or more networks. In FIG. 1, one source 110 and one destination 120 are connected by a single network 130.

When the source 110 streams media 140 to the destination 120 over a path through one or more data networks 130, the source 110 can characterize the path to the destination 120 based on application-level feedback from the destination 120. For example, in related art, one common approach is that the destination 120 requests chunks of media from the source 110, timing these requests to ensure that the chunks of media arrive in time to be rendered for a user at the destination 120.

When the path from the source 110 to the destination 120 is working well, the destination 120 is able to provide acceptable user experience. When the path is impeded, for any of a variety of reasons, the streaming media application (111, 121) implementations at the source 110 and the destination 120 may be aware that there is a problem, but are unlikely to be able to identify the problem. Especially when the streaming media is crossing multiple networks, the source 110 and destination 120 will be unable to identify where the problem is, or even which network the problem is located in. Therefore, the source 110 and/or the destination 120 cannot help the streaming content provider identify who can fix the problem. Commonly, the source 110 would take an action such as switching to a less bandwidth-intensive coding method, attempting to reduce the required bandwidth between the source 110 and the destination 120 and improve the user's experience enough that it will be acceptable.

For this reason, network operators have often deployed network probes 150 along the network path that connect sender and receiver (e.g., connect the source 110 and the destination 120). These network probes 150 detect and report anomalies and impediments (170) encountered by underlying transport protocols (112, 122), such as Transmission Control Protocol (TCP/IP) (RFC 793/RFC 791), to a network monitor function 160 in order to identify problems and impediments, and isolate these problems so that they can be resolved. Because these network probes 150 examine the TCP/IP protocol header fields from the TCP/IP transport protocols (112, 122) that are not encrypted, they can perform this function even if the source 110 is streaming encrypted media content to the destination 120, because while the transport protocol payload is encrypted, the transport protocol headers are not encrypted.

The streaming media application 111 in the source 110 can also send information about the media being streamed to the network monitor function 160, which can correlate information from the application protocol level with information from the underlying transport protocol level.

SUMMARY

One or more example embodiments of the present disclosure provide a method and an apparatus monitoring encrypted traffic between a source and destination using underlying transport metrics at the source or the destination.

According to embodiments, there is provided a method for monitoring encrypted traffic, performed by at least one processor. The method may include generating a transport summary of a media stream at a streaming source using a plurality of transport layer metrics, wherein the media stream is encrypted, and wherein the transport layer metrics comprise path characteristics derived from duplicated QUIC packets in the media stream at the streaming source or a streaming destination, transferring the transport summary to a network monitor function, and analyzing the transport summary and correlating it with transport summaries collected from other sources.

According to embodiments, there is provided an apparatus monitoring encrypted traffic. The apparatus may include at least one memory storing instructions and at least one processor configured to read the program code and operate as instructed by the program code. The program code may include generating code configured to cause the at least one processor to generate a transport summary of a media stream at a streaming source using a plurality of transport layer metrics, wherein the media stream is encrypted, and wherein the transport layer metrics comprise path characteristics derived from duplicated QUIC packets in the media stream at the streaming source or a streaming destination, first transferring code configured to cause the at least one processor to transfer the transport summary to a network monitor function, and first analyzing code configured to cause the at least one processor to analyze the transport summary and correlate it with transport summaries collected from other sources.

According to one or more embodiments, there is provided a non-transitory computer-readable medium storing computer code. The computer code may be configured to, when executed by at least one processor, cause the at least one processor to generate a transport summary of a media stream at a streaming source using a plurality of transport layer metrics, wherein the media stream is encrypted, and wherein the transport layer metrics comprise path characteristics derived from duplicated QUIC packets in the media stream at the streaming source or a streaming destination, transfer the transport summary to a network monitor function, and analyze the transport summary and correlate it with transport summaries collected from other sources.

Additional aspects will be set forth in part in the description that follows and, in part, will be apparent from the description, or may be realized by practice of the presented embodiments of the disclosure.

BRIEF DESCRIPTION OF THE DRAWINGS

The above and other aspects, features, and aspects of embodiments of the disclosure will be more apparent from the following description taken in conjunction with the following accompanying drawings.

DETAILED DESCRIPTION

The present disclosure relates to a method and an apparatus for monitoring encrypted traffic using underlying transport metrics. Embodiments of the present disclosure are described comprehensively with reference to the accompanying drawings. However, the examples of implementations may be implemented in various multiple forms, and the disclosure should not be construed as being limited to the examples described herein. Conversely, the examples of implementations are provided to make the technical solution of the disclosure more comprehensive and complete, and comprehensively convey the idea of the examples of the implementations to a person skilled in the art. The accompanying drawings are merely example illustrations of the disclosure and are not necessarily drawn to scale.

The features discussed below may be used separately or combined in any order. Some block diagrams shown in the accompany drawings are functional entities and do not necessarily correspond to physically or logically independent entities. Further, the embodiments may be implemented by processing circuitry (e.g., one or more processors or one or more integrated circuits) or implemented in the form of software, or implemented in different networks and/or processor apparatuses and/or microcontroller apparatuses. In one example, the one or more processors execute computer program code that is stored in a one or more non-transitory computer-readable media.

Figure 2:
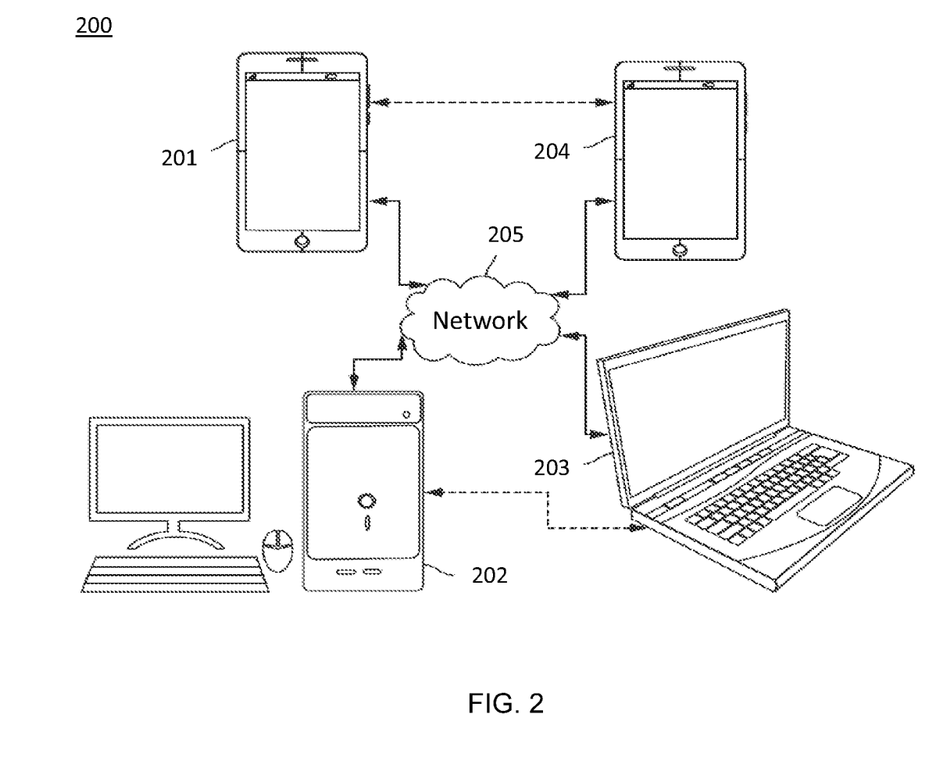
FIG. 2 illustrates a simplified block diagram of a communication system according to one or more embodiments.

FIG. 2 illustrates a simplified block diagram of a communication system 200 according to an embodiment of the present disclosure. The communication system 200 may include at least two terminals 202 and 203 interconnected via a network 205. For unidirectional transmission of data, a first terminal 203 may code video data at a local location for transmission to the other terminal 202 via the network 105. The second terminal 202 may receive the coded video data of the other terminal from the network 205, decode the coded data and display the recovered video data. Unidirectional data transmission may be common in media serving applications and the like.

FIG. 2 illustrates a second pair of terminals 201 and 204 provided to support bidirectional transmission of coded video that may occur, for example, during videoconferencing or media streaming. For bidirectional transmission of data, each terminal 201 and 204 may code video data captured at a local location for transmission to the other terminal via the network 205. Each terminal 201 and 204 also may receive the coded video data transmitted by the other terminal, may decode the coded data and may display the recovered video data at a local display device.

In FIG. 2, the terminals 201, 202, 203 and 204 may be illustrated as servers, personal computers and smart phones but the principles of the present disclosure are not so limited. Embodiments of the present disclosure find application with laptop computers, tablet computers, media players and/or dedicated video conferencing equipment. The network 205 represents any number of networks that convey coded video data among the terminals 201, 202, 203 and 204, including for example wireline and/or wireless communication networks. The communication network 205 may exchange data in circuit-switched and/or packet-switched channels. Representative networks include telecommunications networks, local area networks, wide area networks and/or the Internet. For the purposes of the present discussion, the architecture and topology of the network 205 may be immaterial to the operation of the present disclosure unless explained herein below.

Figure 3:
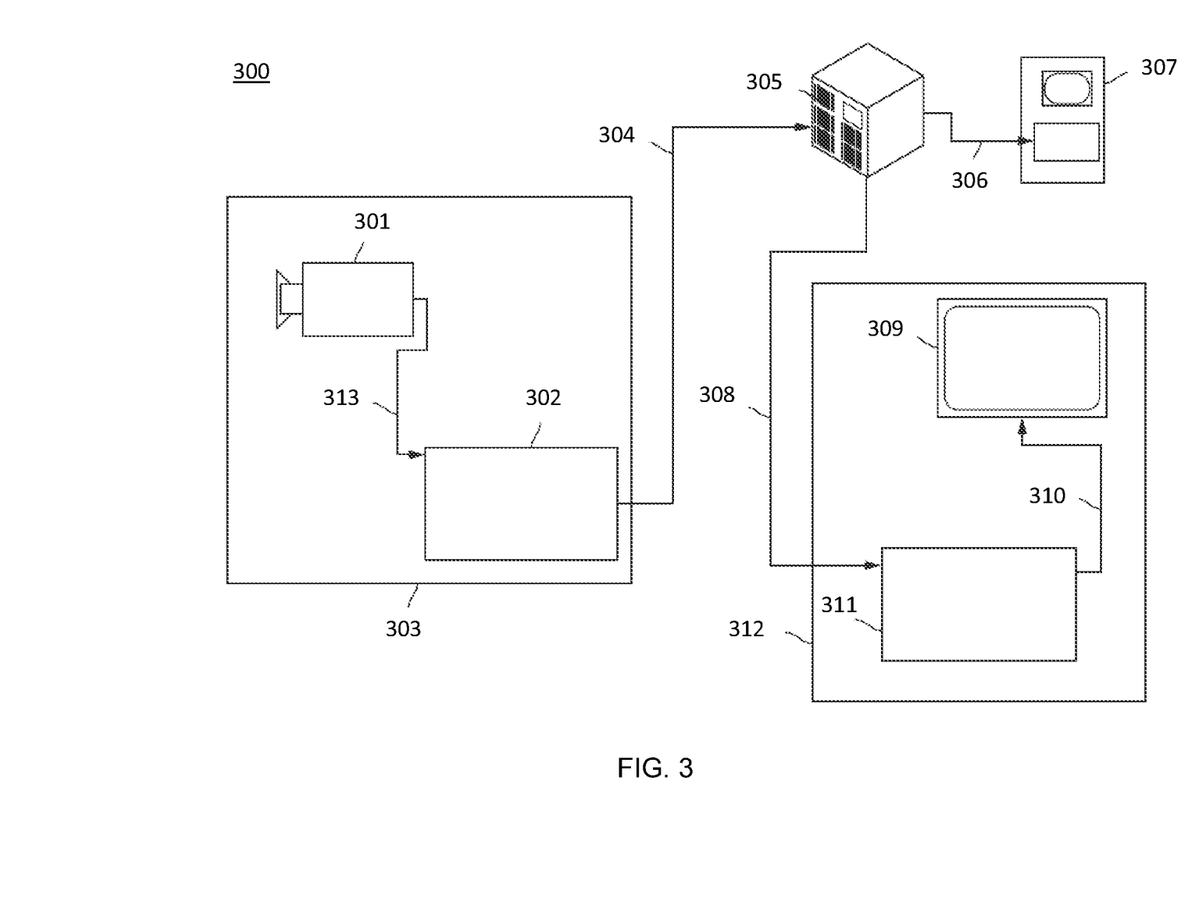
FIG. 3 is a schematic illustration of an exemplary streaming environment according to one or more embodiments.

FIG. 3 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 303, that can include a video source 301, for example a digital camera, creating, for example, an uncompressed video sample stream 313. That sample stream 313 may be emphasized as a high data volume when compared to encoded video bitstreams and can be processed by an encoder 302 coupled to the camera 301. The encoder 302 can include hardware, software, or a combination thereof to enable or implement aspects of the disclosed subject matter as described in more detail below. The encoded video bitstream 304, which may be emphasized as a lower data volume when compared to the sample stream, can be stored on a streaming server 305 for future use. One or more streaming clients 312 and 307 can access the streaming server 305 to retrieve copies 308 and 306 of the encoded video bitstream 304. A client 312 can include a video decoder 311 which decodes the incoming copy of the encoded video bitstream 308 and creates an outgoing video sample stream 310 that can be rendered on a display 309 or other rendering device. In some streaming systems, the video bitstreams 304, 306 and 308 can be encoded according to certain video coding/compression standards. Examples of those standards are noted above and described further herein.

Figure 4:
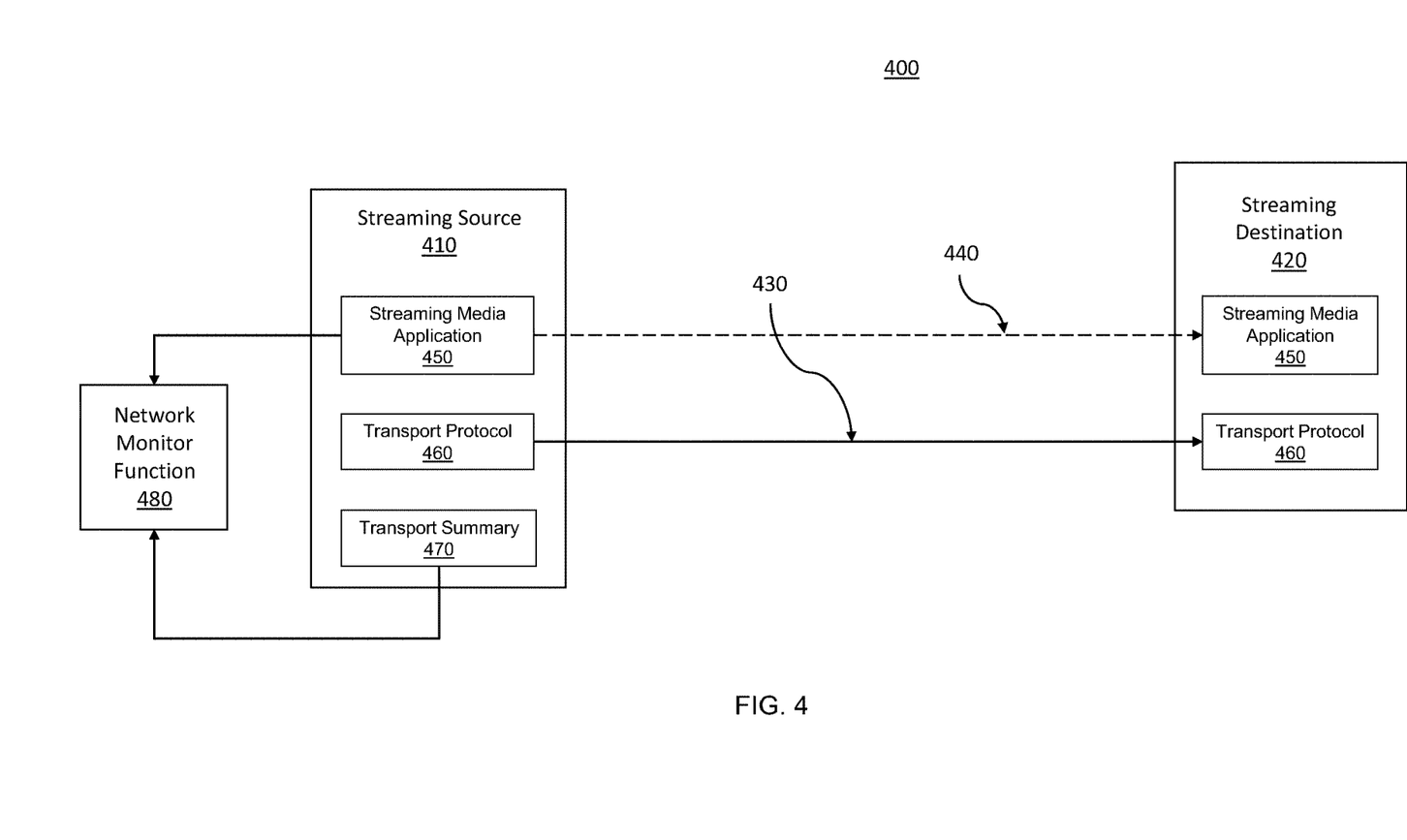
FIG. 4 illustrates a schematic illustration a computer network following a streaming protocol stack over an encrypted transport protocol.

FIG. 4 illustrates a computer network 400 following a streaming protocol stack over an encrypted protocol, according to embodiments. For example, the encrypted protocol may be a Quick UDP Internet Connection (QUIC/UDP/IP). As shown in FIG. 4, the computer network 400 may include a streaming source 410, a streaming destination 420, one or more data networks 430, one or more media stream 440, streaming media applications 450, transport protocols 460, a destination transport summary 470, and a network monitor function 480.

The source 410 may stream the media stream 440 to the destination 420 across one or more networks 430. The source 410 and the destination 420 use transport protocols 460, like the QUIC/UDP/IP (RFC 9000/RFC 763/RFC 791) that encrypts almost all transport protocol header fields. A small number of QUIC header field may be unencrypted (as listed in, for example, RFC 8999, "Version-Independent Properties of QUIC"). The streaming media application 450 in the source 410 may send information about the media being streamed to the network monitor function 480 and the streaming media application 450 in the destination 420 may send information about the media being streamed to the streaming source 410.

In embodiments, the source 410 and the destination 420 of the media stream 440 use an encrypted transport protocol. Thus, network probes (e.g., network probes 150 as shown in FIG. 1) would be unable to read the encrypted transport protocol headers and would be unable to provide useful information to network monitor function 480. As such, instead of relying on network probes to detect problems and anomalies, the source 410 may maintain the destination transport summary 470 and provide transport-level information to the network monitor function 480.

Protocols such as QUIC can also provide improved performance and better information about the path from the source to the destination than is possible with TCP. When the network monitor function 480 correlates this information across observations recorded by multiple senders (i.e., sources), this improves the network operator's understanding of the path characteristics beyond what a single source-destination pair can provide.

Embodiments describe an example method for processing one possible transport event using QUIC transport layer protocol across multiple senders. There are many other possible transport events. It may be understood by those skilled in the art that the other possible transport events may be processed similar to the procedures detailed in embodiments herein.

Sources and destinations can detect duplicate encrypted QUIC packets, while network probes cannot. Thus, the source 410 or destination 420 may summarize the number of QUIC packets that the destination 420 dropped as duplicate packets, and provide this summary to the network monitor function 480 for correlation with reports from other sources or destinations. This allows a network operator to investigate why packets are being duplicated in the network, and whether this is an isolated case, or if it is affecting many users. The summary of the dropped number of QUIC packets may be included by, for example, the transport summary 470 as part of the network transport summary. The transport summary 470 may be provided to the network monitor function 480 periodically, or provided immediately as an alert when a noteworthy event happens, or both.

Figure 5:
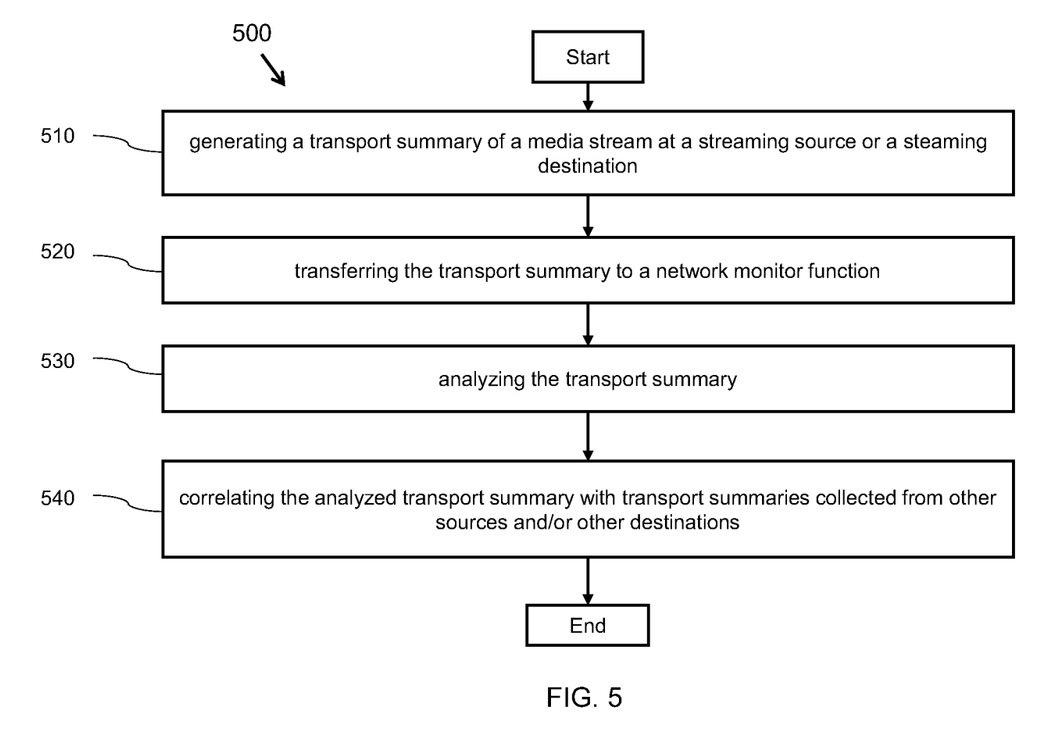
FIG. 5 is a flowchart of a method for monitoring encrypted traffic using underlying transport metrics, according to one or more embodiments.

FIG. 5 illustrates a flowchart of a method 500 for monitoring encrypted traffic using underlying transport metrics, according to one or more embodiments. The method 500 may be performed by, for example, the communication network 400.

As shown in FIG. 5, in operation 510, the method 500 may include generating a transport summary of a media stream at a streaming source or a streaming destination using a plurality of transport layer metrics, wherein the media stream is encrypted, and wherein the transport layer metrics comprise path characteristics derived from duplicated QUIC packets in the media stream at the streaming source or a streaming destination.

In operation 520, the method 500 may include transferring the transport summary to a network monitor function.

In operation 530, the method 500 may include analyzing the transport summary. For example, the analysis may include detecting duplicate QUIC packets in the media stream.

In operation 540, the method 500 may include correlating the analyzed transport summary with transport summaries collected from other sources and/or other destinations.

Although FIG. 5 shows example blocks of the method, in some implementations, the method may include additional blocks, fewer blocks, different blocks, or differently arranged blocks than those depicted in FIG. 5. Additionally, or alternatively, two or more of the blocks of the method may performed in parallel.

Figure 6:
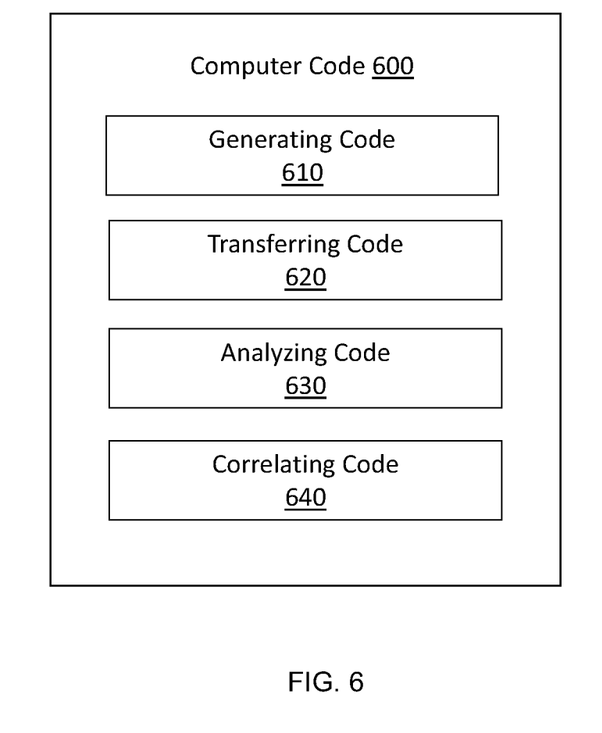
FIG. 6 is a block diagram of an example of computer code for monitoring encrypted traffic using underlying transport metrics, according to one or more embodiments.

FIG. 6 is a block diagram of an example of computer code for monitoring encrypted traffic using underlying transport metrics, according to one or more embodiments.

According to embodiments of the present disclosure, at least one processor with memory storing computer code may be provided. The computer code may be configured to, when executed by the at least one processor, perform any number of aspects of the present disclosure.

As shown in FIG. 6, the computer code 600 may include generating code 610, transferring code 620, analyzing code 630, and correlating code 640.

The generating code 610 may be configured to cause the at least one processor to generate a transport summary of a media stream at a streaming source or a streaming destination using a plurality of transport layer metrics, wherein the media stream is encrypted, and wherein the transport layer metrics comprise path characteristics derived from duplicated QUIC packets in the media stream at the streaming source or a streaming destination.

The transferring code 620 may be configured to cause the at least one processor to transfer the transport summary to a network monitor function.

The analyzing code 630 may be configured to cause the at least one processor to analyze the transport summary. For example, analyzing code 630 may be configured to cause the at least one processor to detect duplicate QUIC packets in the media stream.

The correlating code 640 may be configured to cause the at least one processor to correlate the transport summary with transport summaries collected from other sources.

Although FIG. 6 shows example blocks of the computer code 600 of a system, apparatus, or device according to embodiments, in some implementations, the system may include additional blocks, fewer blocks, different blocks, or differently arranged blocks than those depicted in FIG. 6. Additionally, or alternatively, two or more of the blocks of the system may be combined. In other words, while FIG. 6 shows distinct blocks of code, the various code instructions need not be distinct and could be intermingled.

Figure 7:
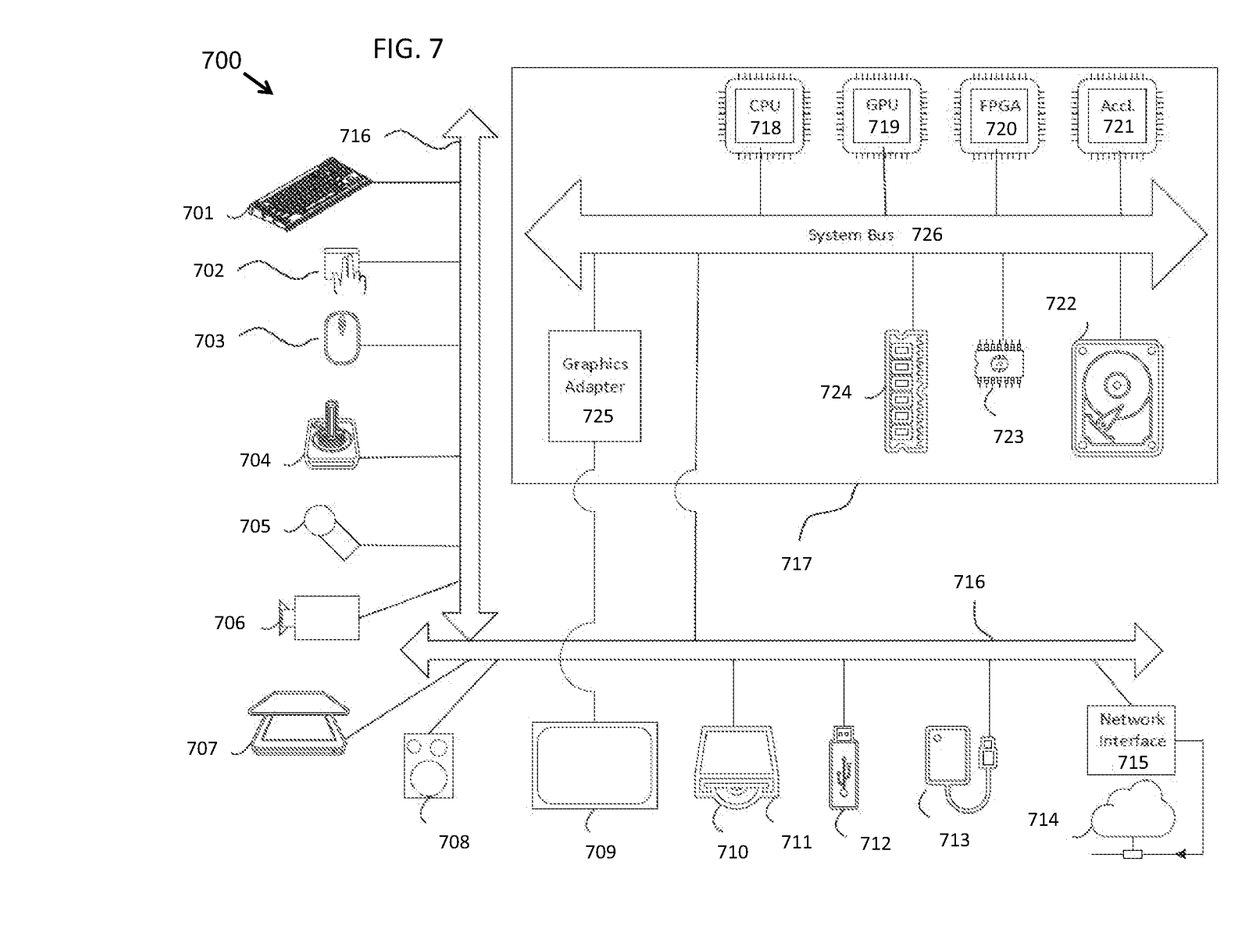
FIG. 7 is a schematic illustration of a computer system, according to one or more embodiments.

The techniques for monitoring encrypted traffic using underlying transport metrics, described above, may be implemented in both sources and destinations as computer software using computer-readable instructions and physically stored in one or more non-transitory computer-readable media or by a specifically configured one or more hardware processors. FIG. 7 shows a computer system 700 suitable for implementing certain embodiments of the disclosed subject matter.

The computer software may be coded using any suitable machine code or computer language, that may be subject to assembly, compilation, linking, or like mechanisms to create code comprising instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

The components shown in FIG. 7 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 700.

Computer system 700 may include certain human interface input devices. Such a human interface input device may be responsive to input by one or more human users through, for example, tactile input (such as keystrokes, swipes, data glove movements), audio input (such as voice, clapping), visual input (such as gestures), olfactory input. The human interface devices can also be used to capture certain media not necessarily directly related to conscious input by a human, such as audio (such as speech, music, ambient sound), images (such as scanned images, photographic images obtained from a still image camera), video (such as two-dimensional video, three-dimensional video including stereoscopic video).

Input human interface devices may include one or more of (only one of each depicted): keyboard 701, trackpad 702, mouse 703, touch-screen 709, data-glove, joystick 704, microphone 705, camera 706, scanner 707.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 709, data-glove, or joystick 704, but there can also be tactile feedback devices that do not serve as input devices), audio output devices (such as: speakers 708, headphones), visual output devices (such as screens 709 to include CRT screens, LCD screens, plasma screens, OLED screens, each with or without touch-screen input capability, each with or without tactile feedback capability—some of which may be capable to output two-dimensional visual output or more than three-dimensional output through means such as stereographic output; virtual-reality glasses, holographic displays and smoke tanks), and printers.

Computer system 700 can also include human accessible storage devices and their associated media such as optical media including CD/DVD ROM/RW 711 with CD/DVD or the like media 710, thumb-drive 712, removable hard drive or solid-state drive 713, legacy magnetic media such as tape and floppy disc, specialized ROM/ASIC/PLD based devices such as security dongles, and the like.

Those skilled in the art should also understand that term "computer-readable media" as used in connection with the presently disclosed subject matter does not encompass transmission media, carrier waves, or other transitory signals.

Computer system 700 can also include an interface 715 to one or more communication networks 714. Networks 714 can, for example, be wireless, wireline, optical. Networks 714 can further be local, wide-area, metropolitan, vehicular and industrial, real-time, delay-tolerant, and so on. Examples of networks 714 include local area networks such as Ethernet, wireless LANs, cellular networks to include GSM, 3G, 4G, 5G, LTE, and the like, TV wireline or wireless wide-area digital networks to include cable TV, satellite TV, and terrestrial broadcast TV, vehicular and industrial to include CANBus, and so forth. Certain networks 714 commonly require external network interface adapters (e.g., graphics adapter 725) that attached to certain general-purpose data ports or peripheral buses 716 (such as, for example, USB ports of the computer system 700; others are commonly integrated into the core of the computer system 700 by attachment to a system bus as described below (for example Ethernet interface into a PC computer system or cellular network interface into a smartphone computer system). Using any of these networks 714, computer system 700 can communicate with other entities. Such communication can be uni-directional, receive only (for example, broadcast TV), uni-directional send-only (for example, CANbus to certain CANbus devices), or bi-directional, for example to other computer systems using local or wide area digital networks. Certain protocols and protocol stacks can be used on each of those networks and network interfaces, as described above.

The aforementioned human interface devices, human-accessible storage devices, and network interfaces can be attached to a core 717 of the computer system 700.

The core 717 can include one or more Central Processing Units (CPU) 718, Graphics Processing Units (GPU) 719, specialized programmable processing units in the form of Field Programmable Gate Areas (FPGA) 720, hardware accelerators 721 for certain tasks, and so forth. These devices, along with Read-only memory (ROM) 723, Random-access memory (RAM) 724, internal mass storage such as internal non-user accessible hard drives, SSDs, and the like 722, may be connected through a system bus 726. In some computer systems, the system bus 726 can be accessible in the form of one or more physical plugs to enable extensions by additional CPUs, GPU, and the like. The peripheral devices can be attached either directly to the core's system bus 726, or through a peripheral bus 716. Architectures for a peripheral bus include PCI, USB, and the like.

CPUs 718, GPUs 719, FPGAs 720, and accelerators 721 can execute certain instructions that, in combination, can make up the aforementioned computer code. That computer code can be stored in ROM 723 or RAM 724. Transitional data can be also be stored in RAM 724, whereas permanent data can be stored, for example, in the internal mass storage 722. Fast storage and retrieval to any of the memory devices can be enabled through the use of cache memory, which can be closely associated with one or more CPU 718, GPU 719, mass storage 722, ROM 723, RAM 724 and the like.

The computer-readable media can have computer code thereon for performing various computer-implemented operations. The media and computer code can be specially designed and constructed for the purposes of the present disclosure, or they can be of the kind well known and available to those having skill in the computer software arts.

As an example and not by way of limitation, the computer system having architecture 700, and specifically the core 717 can provide functionality as a result of processor(s) (including CPUs, GPUs, FPGA, accelerators, and the like)

executing software embodied in one or more tangible, computer-readable media. Such computer-readable media can be media associated with user-accessible mass storage as introduced above, as well as certain storage of the core 717 that are of non-transitory nature, such as core-internal mass storage 722 or ROM 723. The software implementing various embodiments of the present disclosure can be stored in such devices and executed by core 717. A computer-readable medium can include one or more memory devices or chips, according to particular needs. The software can cause the core 717 and specifically the processors therein (including CPU, GPU, FPGA, and the like) to execute particular processes or particular parts of particular processes described herein, including defining data structures stored in RAM 724 and modifying such data structures according to the processes defined by the software. In addition or as an alternative, the computer system can provide functionality as a result of logic hardwired or otherwise embodied in a circuit (for example, accelerator 721), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for monitoring encrypted traffic, performed by at least one processor and comprising:
    generating, by a streaming source, a transport summary of a media stream using a plurality of transport layer metrics, wherein the media stream is encrypted, and wherein the transport layer metrics comprise first path characteristics derived from QUIC packets in the media stream dropped by a streaming destination as duplicate QUIC packets;
    transferring, by the streaming source, the transport summary to a network monitor function; and
    determining, by the network monitor function, a cause of packet duplication based on an analysis of the transport summary from the streaming source and correlating the transport summary with transport summaries collected from more than one other streaming sources, the analysis and the correlating being based on second path characteristics derived from QUIC packets dropped as duplicate QUIC packets by the more than one other streaming destinations.

2. The method of claim 1, wherein the transport summary is generated at the streaming destination of the media stream.

3. The method of claim 1, wherein the generating further comprises:
    detecting QUIC packets in the media stream at the streaming source or streaming destination that are duplicate QUIC packets;
    transferring information on the duplicate QUIC packets to the network monitor function; and
    analyzing the information on the duplicate QUIC packets and correlating the information on the duplicate QUIC packets with reports collected from the other sources or other destinations.

4. The method of claim 1, wherein the streaming source is streaming media to the streaming destination across one or more networks using a QUIC transport layer protocol.

5. The method of claim 3, wherein the streaming destination removes the duplicate QUIC packets.

6. The method of claim 1, wherein the transport summary is transferred to the network monitor function periodically.

7. The method of claim 1, wherein the transport summary is transferred to the network monitor function immediately based on an occurrence of a predetermined event.

8. An apparatus for monitoring encrypted traffic, the apparatus comprising:
    at least one memory configured to store program code; and
    at least one processor configured to read the program code and operate as instructed by the program code, the program code including:
        generating code configured to cause the at least one processor to, at a streaming source, generate a transport summary of a media stream using a plurality of transport layer metrics, wherein the media stream is encrypted, and wherein the transport layer metrics comprise first path characteristics derived from QUIC packets in the media stream dropped by a streaming destination as duplicate QUIC packets;
        first transferring code configured to cause the at least one processor, at the streaming source, to transfer the transport summary to a network monitor function; and
        first analyzing code configured to cause the at least one processor, at the network monitor function, to determine a cause of packet duplication based on an analysis of the transport summary from the streaming source and correlate the transport summary with transport summaries collected from more than one other streaming sources, the analysis and the correlating being based on second path characteristics derived from QUIC packets dropped as duplicate QUIC packets by more than one other streaming destinations.

9. The apparatus of claim 8, wherein the transport summary is generated at the streaming destination of the media stream.

10. The apparatus of claim 8, the program code further including:
    detecting code configured to cause the at least one processor to detect QUIC packets in the media stream at the streaming source or streaming destination that are duplicate QUIC packets;
    second transferring code configured to cause the at least one processor to transfer information on the duplicate QUIC packets to the network monitor function; and
    second analyzing code configured to cause the at least one processor to analyze the information on the duplicate QUIC packets and correlate the information on the duplicate QUIC packets with reports collected from the other sources or other destinations.

11. The apparatus of claim 8, wherein the streaming source is streaming media to the streaming destination across one or more networks using a QUIC transport layer protocol.

12. The apparatus of claim 10, wherein the streaming destination removes the duplicate packets.

13. The apparatus of claim 8, wherein the transport summary is transferred to the network monitor function periodically.

14. The apparatus of claim 8, wherein the transport summary is transferred to the network monitor function immediately based on an occurrence of a predetermined event.

15. A non-transitory computer readable medium storing instructions, the instructions comprising: one or more instructions that, when executed by at least one processor of an apparatus for monitoring encrypted traffic storing instructions that, cause the at least one processor to:
   generate, by a streaming source, a transport summary of a media stream using a plurality of transport layer metrics, wherein the media stream is encrypted, and wherein the transport layer metrics comprise first path characteristics derived from QUIC packets in the media stream dropped by a streaming destination as duplicate QUIC packets;
   transfer, by the streaming source, the transport summary to a network monitor function; and
   determine, by the network monitor function, a cause of packet duplication based on an analysis of the transport summary from the streaming source and correlate the transport summary with transport summaries collected from more than one other streaming sources, the analysis and the correlating being based on second path characteristics derived from QUIC packets dropped as duplicate QUIC packets by more than one other streaming destination.

16. The non-transitory computer readable medium of claim 15, wherein the transport summary is generated at the streaming destination of the media stream.

17. The non-transitory computer readable medium of claim 15, wherein the instructions further cause the at least one processor to:
   detect QUIC packets in the media stream at the streaming source or streaming destination that are duplicate QUIC packets;
   transfer information on the duplicate QUIC packets to the network monitor function; and
   analyze the information on the duplicate QUIC packets and correlate the information on the duplicate QUIC packets with reports collected from the other sources or other destinations, and
   wherein the streaming destination removes the duplicate packets.

18. The non-transitory computer readable medium of claim 15, wherein the streaming source is streaming media to the streaming destination across one or more networks using a QUIC transport layer protocol.

19. The non-transitory computer readable medium of claim 15, wherein the transport summary is transferred to the network monitor function immediately based on an occurrence of a predetermined event.

20. The non-transitory computer readable medium of claim 15, wherein the transport summary is transferred to the network monitor function periodically.

* * * * *